J. H. DAVIES.
MILK RELEASER FOR MILKING MACHINES.
APPLICATION FILED MAR. 18, 1918.
1,281,146.
Patented Oct. 8, 1918.
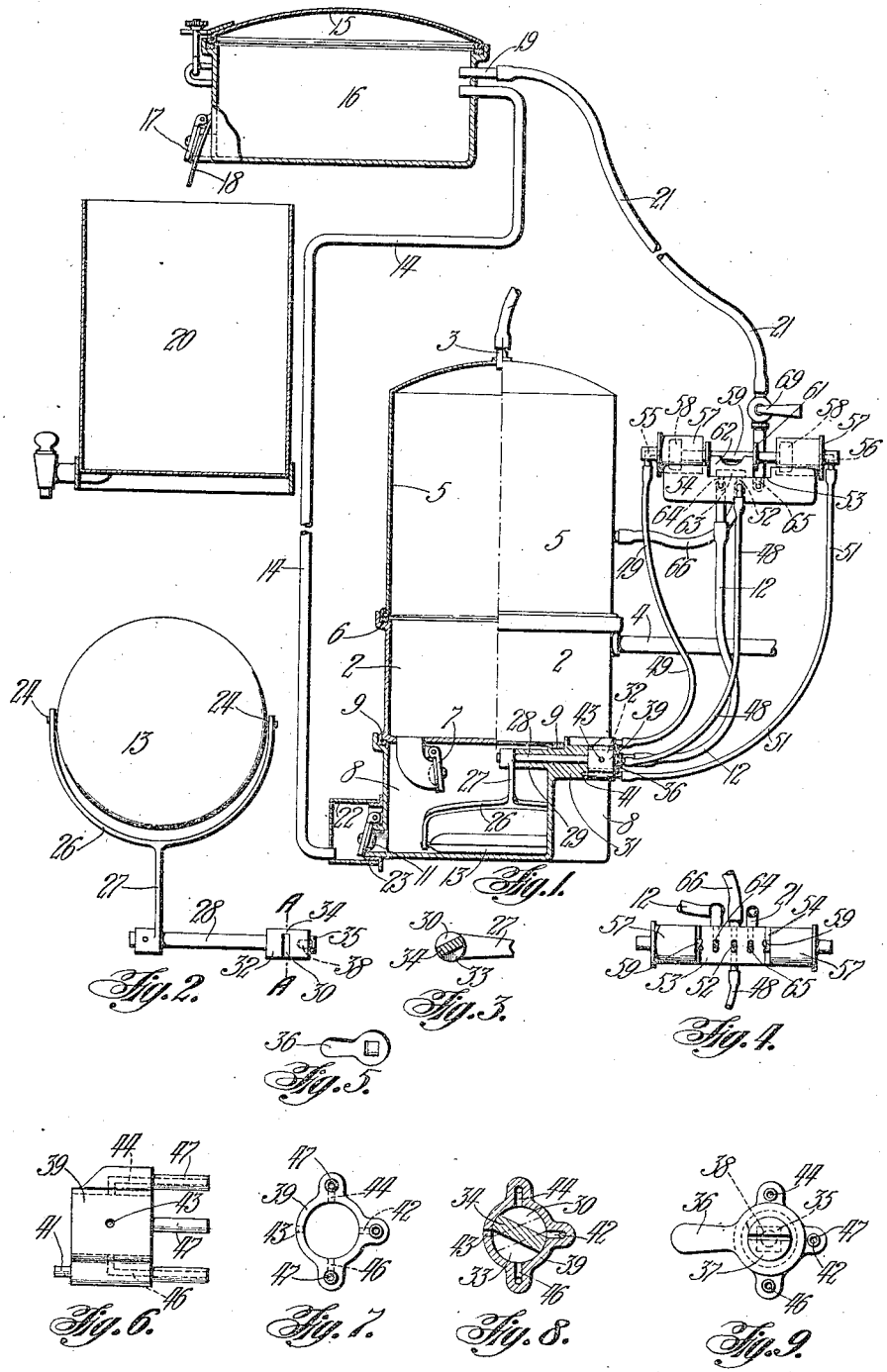
Inventor:
John Henry Davies

UNITED STATES PATENT OFFICE.

JOHN H. DAVIES, OF MELBOURNE, VICTORIA, AUSTRALIA.

MILK-RELEASER FOR MILKING-MACHINES.

1,281,146.      Specification of Letters Patent.      Patented Oct. 8, 1918.

Application filed March 18, 1918. Serial No. 223,169.

*To all whom it may concern:*

Be it known that I, JOHN HENRY DAVIES, a subject of the King of Great Britain and Ireland, and a resident of the city of Melbourne, in the county of Bourke, State of Victoria, Commonwealth of Australia, (whose post-office address is 592 Bourke street, in the said city of Melbourne,) have invented certain new and useful Improvements in Milk-Releasers for Milking-Machines, of which the following is a specification.

This invention relates to that class of apparatus used to receive and deliver the milk from the pipes of milking machines without breaking down the vacuum therein or interfering with milking operations and which are commonly known as milk releasers.

The object of the invention is to produce a highly efficient and reliable apparatus of the kind indicated and which can be adapted, if desired to automatically elevate the milk from the reservoir in which it is received from the milking machine to a higher level than or to a distance from the said reservoir without the loss of vacuum and power in the plant.

The essence of the invention resides in the use of an auxiliary valve controlled by the rise and fall of a body of milk and adapted to operate a releasing valve which alternately admits air and vacuum into a chamber or chambers thus automatically releasing the milk in said chambers and if desired elevating the milk from one chamber to the other. The periods at which the vacuum and air are admitted to the chamber or chambers and the milk is discharged therefrom are governed as aforesaid by variations in the quantity of milk controlling the auxiliary valve.

Referring to the drawings which form a part of this specification;—

Figure 1 is a diagrammatic view of the invention partly in section taken tangentially through a second chamber. The float is shown down and the releasing valve in position to admit vacuum to the second chamber and air to the third or elevated chamber.

Fig. 2 is a plan of a float and its associated parts.

Fig. 3 is a section on line A—A of Fig. 2.

Fig. 4 is a plan of a releasing valve support and cylinder showing the three ports which the valve controls. Parts are removed for convenience of illustration.

Fig. 5 is a perspective view of a finger lever.

Fig. 6 is a side view of a cylindrical casing which incloses the oscillating auxiliary valve.

Fig. 7 is an end view of Fig. 6.

Fig. 8 is a cross section through the auxiliary valve and its casing. In full lines the valve is shown in the position it occupies when the float is down and in dotted lines its position when the float has risen to its highest point.

Fig. 9 is an end view of the cylindrical casing, auxiliary valve and finger lever assembled.

This invention includes a first chamber or reservoir 2 having a vacuum inlet 3 which is connected to the vacuum service of the machine, and also a milk inlet 4 through which the milk is delivered from the pipes of the milking machine. The first chamber is preferably provided with a dome 5 which is held tightly against a jointing ring 6 by the external pressure of air and the vacuum inside the chamber.

Situated at or near the bottom of the first chamber is a non return valve 7 which opens outwardly into a second chamber, 8. The second chamber has at its top a jointing ring 9 and at its bottom a non return valve 11 also adapted to open outwardly. In the upper portion of the second chamber is an alternate vacuum and air inlet which by a suitable communication pipe or tube 12 communicates with a releasing valve hereinafter referred to.

Situated in the second chamber is a float 13 which controls an auxiliary valve adapted to alternately supply air and vacuum to each end of a cylinder hereinafter referred to.

Communicating, by means of a suitable connecting pipe or passageway 14 with the non return valve 11 of the second chamber is a third chamber 16. This chamber may be situated at any desired height above or at a distance from the first and second chambers and is provided with an air tight cover 15 and a non-return discharge valve 17, at or near its bottom. Around the valve 17 may be a milk distributing disk or bib 18 over which the milk flows into a suitable receiving vessel 20. Opening into the top of the third chamber is an alternate vacuum and air inlet 19 which by a suitable communication pipe or tube 21 also communicates with the releasing valve before mentioned and hereinafter described. The pipe 14 is adapted to be readily disconnected from the non return valve 11 in case it is not required to elevate the milk and for this purpose suitable means such as a removable cover 22 fitting onto a fixed ring or sleeve 23 may be provided.

The float above referred to is pivoted by trunnions 24 to a yoke 26 having an arm 27 the outer end of which is fixed to the inner end of a spindle 28. This spindle extends tangentially through the wall of the second chamber which is provided with an internal boss 29 and an external boss 31 to form a bearing for the spindle. Carried by the outer end of the spindle in an oscillating auxiliary valve 32 having opposite grooves or passages 30 and 33 between which is a bridge 34. Adjoining the valve is a squared or flattened end 35 to accommodate a finger lever 36 by which the float may be lifted and the auxiliary valve operated by hand if so required. This lever is held in place by a screw 37 threaded into a central hole 38 in the end of the valve.

Surrounding the valve 32 is a cylindrical casing 39 which is open at both ends and is provided with a guide pin 41 which fits into a small hole in the end of the boss 31 and retains the casing in correct position on the valve. Communicating with the interior of the casing is a vacuum port 42, an air port 43, and two alternate vacuum and air ports 44 and 46. The ports, 42, 44 and 46 are provided with nipples 47 to receive flexible tubes 48, 49 and 51 which communicate with the ports 42, 44, and 46 respectively.

The opposite end of the tube 48 communicates with a vacuum port 52 which is located centrally in the face 53 of a slide valve support 54 and is in permanent communication with the vacuum supply. The other ends of the tubes 49 and 51 communicate respectively with alternate vacuum and air inlets 55 and 56 in the opposite ends of a releasing valve cylinder 57 which is preferably of the divided construction shown. Within the cylinder are pistons 58 carried by a piston rod 59 which has collars 61 formed thereon. Between the collars is a releasing valve 62 adapted to slide on the face 53 and having a communication port 63 which alternately brings the vacuum port 52 into communication with vacuum and air ports 64 and 65 in the face 53.

Leading from the dome 5 to the port 52 is a vacuum supply tube 66. Leading from the port 64 to the top of the second chamber 8 is the alternate vacuum and air tube 12 and leading from the port 65 to the third chamber 16 is the alternate vacuum and air tube 21. This latter tube is provided with a tap 69 which is closed when it is not desired to elevate milk to the third chamber.

The invention operates as follows:—The milk is delivered through the pipe 4 from the milking machine into the first chamber or reservoir from whence it passes through the non-return valve into the second chamber, the pistons and the releasing valve being in such a position that a vacuum exists therein owing to the port 64 and tube 12 being closed to the atmosphere and open to the vacuum port 52 as seen in Fig. 1.

As the milk rises in the second chamber it lifts the float and oscillates the auxiliary valve into the position shown in dotted lines in Fig. 8 thereby allowing vacuum to pass from the vacuum pipe 48 and port 42 through the passage 33, port 46 and tube 51 into the right hand end of the cylinder in Fig. 1. At the same time air is admitted through the port 43, passage 30, port 44 and tube 49 into the opposite or left hand end of the cylinder. This causes the pistons to move to the right thereby bringing the releasing valve into position to admit atmospheric air through the port 64 and tube 12 into the second chamber and vacuum from the port 52 through the port 65 and tube 21 into the third chamber 16. The air now in the second chamber causes the non-return valve 7 in the bottom of the first chamber in which a permanent vacuum exists to remain closed while the milk in the second chamber passes through its non-return valve 11 and is elevated through the pipe 14 into the third chamber. As the second chamber becomes empty the float falls and causes the auxiliary valve to assume the position shown in full lines in Fig. 8 and again reverse the position of the pistons thus admitting vacuum again into the second chamber and air into the third chamber, from which the milk escapes through the discharge valve 17. At the same time more milk enters the second chamber from the first chamber, the operation continuing as described. It will be seen on reference to Fig. 8 that while the bridge 34 is passing the ports 42 and 43 both ends of the cylinder are entirely cut off from the vacuum and air and the pistons and releasing valve will remain stationary thus the air or vacuum is not admitted to the second or third chamber until the bridge commences to uncover the ports 42, 43 and the chambers are almost full or empty as the case may be. If it is not desired to elevate the milk the tap 69 is closed and the cover 22 removed. The milk may now be discharged from the discharge valve 11 of the second chamber into any suitable receptacle, or the third chamber and its connections may be dispensed with entirely.

As will be readily understood it is not essential that the float be situated in the second chamber as, for instance it may be located in the first chamber in which case the relative positions of the float when air and vacuum are admitted to the second chamber, will of course be reversed.

It will be obvious that various constructional changes may be made in the form of the auxiliary and releasing valve and other parts without departing from the spirit and scope of the invention as defined by the appended claims, furthermore it will be understood that the invention is not limited in its use as a milk releaser as it may be used with equal advantages in similarly dealing with other liquids by the aid of vacuum or compressed air.

Having now described my invention, what I claim as new and desire to secure by Letters Patent is:—

1. In apparatus of the character described, a first chamber, a connection for producing a permanent vacuum within the first chamber during the operation of the apparatus, a second chamber, a check valve for the passage of milk between the first and second chambers, a first conduit leading into the second chamber, a slide valve support having a port in communication with the first conduit, said slide valve support having a vacuum port arranged upon one side of the first named port, a second conduit connecting the first chamber and vacuum port, a third conduit connecting with the vacuum port, a slide valve adapted to alternately place the first conduit in communication with the vacuum port and the atmosphere, vacuum operated means to shift the slide valve and having connection with the third conduit, and means to control the operation of the vacuum operated means and operated by the change in level of the liquid in the second chamber.

2. In apparatus of the character described, a first chamber, a connection for producing a permanent vacuum therein during the operation of the apparatus, a second chamber, a check valve for the passage of milk between the first and second chambers, a first conduit leading into the second chamber, a slide valve support having a port in communication with the first conduit, said slide valve support having a vacuum port arranged upon one side of the first named port and a third port arranged upon the opposite side of the first named port, a second conduit connecting the first chamber and vacuum port, a third conduit connected with the vacuum port, a slide valve adapted to alternately place the first and third ports in communication with the vacuum port, a third chamber, a fourth conduit connecting the third chamber and the third port, a fifth conduit connecting the third chamber and second chamber and having a check valve connected therein, vacuum operated means to shift the slide valve and having connection with the third conduit, and means to control the operation of the vacuum operated means and operated by the change in level of the liquid in the second chamber.

3. In apparatus of the character described, a first chamber, a connection for producing a permanent vacuum therein during the operation of the apparatus, a second chamber, a check valve for the passage of milk between the first and second chambers, a first conduit leading into the second chamber, a slide valve support having a port in communication with the first conduit, said slide valve support having a vacuum port arranged upon one side of the first named port and a third port arranged upon the opposite side of the first named port, a slide valve adapted to alternately place the first and third ports in communication with the vacuum port, a third chamber, a third conduit connecting the third chamber and the third port, a fourth conduit connecting the third chamber and second chamber and having a check valve connected therein, vacuum operated means to shift the slide valve and having means of communication with the vacuum port, and means to control the operation of the vacuum operated means.

4. In apparatus of the character described, a first chamber, a connection for producing a vacuum within the first chamber during the operation of the apparatus, a second chamber, means for the passage of milk between the first and second chambers including a check valve, means connected with the first chamber to place the same into communication with the second chamber and thereby create a vacuum within the second chamber, vacuum operated means controlled by the rise of liquid in the second chamber above a predetermined level to break said vacuum communication between the first and second chambers and introduce air into the second chamber and valve controlled outlet means for the second chamber.

5. In a milk releaser a first chamber or reservoir having a permanent vacuum supply, a second chamber, a non-return valve leading from the first chamber to the second chamber, a non-return valve leading from the second chamber, a float, an auxiliary valve oscillated by the rise and fall of said float, a cylindrical casing surrounding said auxiliary valve said casing having a permanent vacuum port a permanent air port and two alternate vacuum and air ports adapted to be alternately brought into communication with said permanent vacuum and air ports by the oscillation of said valve, a cylinder having each opposite end in communication with one of said alternate vacuum and air ports, a slide valve support having a permanent vacuum port in communication with the first chamber and an alternate vacuum and air port in communication with the second chamber, pistons in said cylinder and a slide valve operated by said pistons and adapted to alternately bring the last mentioned port into communication with the permanent vacuum port in the slide valve support, and the atmosphere.

6. In a milk releaser a first chamber or reservoir having a permanent vacuum supply, a second chamber, a non-return valve leading from the first chamber to the second chamber, a third chamber, having a milk inlet in communication with the outlet of the second chamber, a non-return valve between the second and third chambers, a float-actuated auxiliary valve, and a releasing valve operated by said auxiliary valve and adapted to alternately admit air and vacuum to the second and third chambers as the float rises and falls.

7. In a milk releaser a first milk chamber or reservoir having a permanent vacuum supply, a second chamber, a non-return valve leading from the first chamber to the second chamber, a third chamber having a milk inlet in communication with the outlet of the second chamber, a non-return valve between said second and third chambers, a float, an auxiliary valve oscillated by the rise and fall of said float, a cylindrical casing surrounding said auxiliary valve said casing having a permanent vacuum port, a permanent air port and two alternate vacuum and air ports adapted to be alternately brought into communication with said permanent vacuum and air ports by the oscillation of said valve, a cylinder having each opposite end in communication with one of said alternate vacuum and air ports, a slide valve support having a permanent vacuum port in communication with the first chamber and alternate vacuum and air ports communicating respectively with the second and third chambers, means to cut off communication between the third chamber and its respective vacuum and air port and a slide valve operated by the alternate admission of vacuum and air to the ends of the cylinder and adapted to alternately bring the vacuum and air ports of the second and third chambers into communication with the permanent vacuum port in the slide valve support, and the atmosphere.

8. In apparatus of the character described, a first chamber, a connection for producing a permanent vacuum therein during the operation of the apparatus, a second chamber, a check valve for the passage of milk between the first and second chambers, a conduit connected with the second chamber and having a check valve connected therein, a third chamber having connection with the conduit to receive the liquid therefrom, means to alternately place the second chamber into communication with the first chamber and the atmosphere, and means to create a vacuum within the third chamber when the second chamber is in communication with the atmosphere.

9. In apparatus of the character described, a first chamber, a connection for producing a permanent vacuum therein during the operation of the apparatus, a second chamber, a check valve for the passage of milk between the first and second chambers, a conduit connected with the second chamber and having a check valve connected therein, a third chamber having connection with the conduit, and means to alternately place the second and third chambers in communication with the first chamber for creating vacuums therein.

In testimony whereof I affix my signature.

J. H. DAVIES.

Copies of this patent may be obtained for five cents each, by addressing the "Commissioner of Patents, Washington, D. C."